US007392038B1

(12) United States Patent
Ratschunas et al.

(10) Patent No.: US 7,392,038 B1
(45) Date of Patent: Jun. 24, 2008

(54) LOCATION SENSITIVE MULTIMEDIA MESSAGING (MMS)

(75) Inventors: Kalevi Ratschunas, Espoo (FI); Ahti Muhonen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/089,681

(22) PCT Filed: Oct. 8, 1999

(86) PCT No.: PCT/EP99/07563

§ 371 (c)(1),
(2), (4) Date: May 22, 2002

(87) PCT Pub. No.: WO01/28171

PCT Pub. Date: Apr. 19, 2001

(51) Int. Cl.
H04L 12/58 (2006.01)
H04Q 7/22 (2006.01)
H04M 1/725 (2006.01)
H04M 1/64 (2006.01)

(52) U.S. Cl. .............. 455/412.1; 455/456.5; 455/466; 455/517; 455/560; 455/413; 379/67.1

(58) Field of Classification Search ............... 455/466, 455/412.1, 413, 456.5, 517, 560; 370/310; 379/67.1
See application file for complete search history.

(56) References Cited

U.S. PATENT DOCUMENTS

| 4,972,461 | A | * | 11/1990 | Brown et al. ............. 379/88.26 |
| 5,353,259 | A | * | 10/1994 | Howes et al. ............ 369/25.01 |
| 5,434,909 | A | * | 7/1995 | Price et al. .............. 379/88.01 |
| 5,481,597 | A | * | 1/1996 | Given ..................... 379/88.23 |
| 5,493,692 | A |   | 2/1996 | Theimer et al. ............ 455/26.1 |
| 5,711,011 | A | * | 1/1998 | Urs et al. ..................... 455/520 |
| 5,717,741 | A | * | 2/1998 | Yue et al. ................. 379/88.12 |
| 5,930,239 | A | * | 7/1999 | Turcotte .................... 370/310 |
| 5,966,663 | A | * | 10/1999 | Gleason .................... 455/466 |
| 6,070,072 | A | * | 5/2000 | Dorenbosch et al. ........ 455/423 |
| 6,101,393 | A | * | 8/2000 | Alperovich et al. ......... 455/466 |
| 6,119,014 | A | * | 9/2000 | Alperovich et al. ......... 455/466 |

(Continued)

FOREIGN PATENT DOCUMENTS

EP   0785 661 A2   7/1997

(Continued)

OTHER PUBLICATIONS

Translation of a Japanese Office Action dated Sep. 6, 2005 in Japanese Patent Application No. 2001-530274.

*Primary Examiner*—Fan Tsang
*Assistant Examiner*—Lisa Hashem
(74) *Attorney, Agent, or Firm*—Alston & Bird LLP

(57) ABSTRACT

The invention proposes a method for delivering messages in a network comprising at least one terminal device, comprising the steps of generating a message (S1), setting a condition for receiving the message (S2, S3), deciding whether the message is to be received by the terminal device on the basis of the condition (S5, S6), and trans-mitting the message to the terminal device on the basis of the result of the deciding step (S8). By this method, messages are only transmitted to a terminal device if certain condition, e.g., location conditions, are met. The invention also proposes a network system and a message generating device, a message delivering device and a terminal device adapted to the above method.

24 Claims, 3 Drawing Sheets

U.S. PATENT DOCUMENTS

| | | | | |
|---|---|---|---|---|
| 6,151,507 A | * | 11/2000 | Laiho et al. | 455/466 |
| 6,208,870 B1 | * | 3/2001 | Lorello et al. | 455/466 |
| 6,216,008 B1 | * | 4/2001 | Lee | 455/466 |
| 6,289,223 B1 | * | 9/2001 | Mukherjee et al. | 455/466 |
| 6,424,841 B1 | * | 7/2002 | Gustafsson | 455/466 |
| 6,442,159 B2 | * | 8/2002 | Josse et al. | 370/354 |
| 6,611,516 B1 | * | 8/2003 | Pirkola et al. | 370/352 |
| 6,636,733 B1 | * | 10/2003 | Helferich | 455/466 |
| 6,732,273 B1 | * | 5/2004 | Byers | 713/193 |
| 6,928,290 B2 | * | 8/2005 | Byers et al. | 455/455 |
| 7,127,264 B2 | * | 10/2006 | Hronek et al. | 455/466 |
| 2003/0153302 A1 | * | 8/2003 | Lewis et al. | 455/412 |
| 2005/0181766 A1 | * | 8/2005 | Rooke et al. | 455/412.1 |
| 2005/0265525 A1 | * | 12/2005 | Tang et al. | 379/88.13 |
| 2006/0047766 A1 | * | 3/2006 | Spadea, III | 709/206 |
| 2007/0190985 A1 | * | 8/2007 | Bai et al. | 455/414.1 |

FOREIGN PATENT DOCUMENTS

| | | |
|---|---|---|
| JP | 10327472 A | 12/1998 |
| JP | 11177612 A | 7/1999 |
| WO | WO 97/10558 | 3/1997 |
| WO | WO 97/28518 | 8/1997 |

* cited by examiner

LOCATION SENSITIVE MULTIMEDIA MESSAGING (MMS)

PRIORITY CLAIM

This is a national stage of PCT application No. PCT/EP99/07563, filed on Oct. 8, 1999. Priority is claimed on that application.

FIELD OF THE INVENTION

The present invention relates to a method a network system for delivering messages in a network comprising at least one terminal device.

BACKGROUND OF THE INVENTION

The invention relates to delivering of messages and in particular to delivering of multimedia messages which are delivered by the so-called Multimedia Messaging Service (MMS). A Multimedia Message (MM) can contain all kind of messages, like pictures, video clips, sounds, speech etc., or any arbitrary combination of these.

From a technical viewpoint, the MMS provides a non-realtime service which operates partly in a store-and-forward fashion. Multimedia messages are transmitted using an air interface (for example, a GPRS air interface, any Wireless LAN, UMTS etc.).

The multimedia messages can be sent from an identified user/application of a network (e.g., intranet) to a mobile station (MS), from the MS to the network (intranet or internet) or from the MS to another MS.

Furthermore, a network element providing important functions for the MMS is the so-called Multimedia Messaging Service Centre (MMSC). The MMSC contains a store-and-forward function which stores the multimedia messages in a database and tries to send them to the recipient mobile station (MS). For this, the MMSC is informed automatically when the MS has become reachable.

Multimedia messages usually have a validity period. The messages are removed from the database of the MMSC in which they are stored if they cannot be delivered to the MS during the validity period.

Regarding the delivery of the messages, the mobile terminated multimedia messages have two delivery options: The multimedia message is sent automatically to the recipient MS, or the recipient is informed of the arrived multimedia message using SMS, for example. The notification contains at least the message size and the message identification. Then, the user can explicitly request the network to the multimedia message to the MS. The choice between the delivery options can based on the message size or the message content type. For example, it can be set that messages less than 1000 kB are delivered automatically to the MS, or that text and voice messages are delivered automatically to the MS.

When sending messages, it is often not always useful to transmit a message to a recipient MS. For example, in case such a message contains tourist information concerning a particular town, it is not useful to send this message to a user, who has left this town.

This is in particular a problem in case the message is a multimedia message which is in general considerably large. Thus, if such a message is transmitted although it is not required, the corresponding network is affected to an undesirable heavy load.

SUMMARY OF THE INVENTION

Therefore, the object underlying the invention resides in removing the above drawbacks of the prior art.

This object is solved by a method according to claim 1. In particular, according to the invention, a method for delivering messages in a network comprising at least one terminal device is provided. The method comprises the steps of generating a message, setting a condition for receiving the message, deciding whether the message is to be received by a terminal device on the basis of the condition, and transmitting the message to the terminal device on the basis of the result of the deciding step.

Alternatively, the above object is solved by a network system for delivering messages in a network as defined in claim 12. The network system comprises a message delivering device, and a terminal device. The message delivering device comprises a deciding means adapted to decide whether a message is to be received by the terminal device on the basis of a condition for receiving the message. Furthermore, the message delivering device comprises a transmitting means adapted to transmit the message on the basis of the deciding result of the deciding means to the terminal device.

Thus, by the method and the system according to the invention, a condition can be set for delivering a message to a terminal. That is, if this condition is not met, the message is not delivered. By this measure, the load on the network is reduced since no messages are transmitted which are not required.

In addition, the invention proposes a report delivery condition setting device according to claim 24 for setting a condition for receiving a delivery report. The report delivery condition setting device comprises a setting means for setting a condition for receiving the message by a terminal device, and a supplying means for supplying the message including the condition to a message delivering device.

Moreover, the invention proposes a message delivering device for delivering a message in a network wherein for the message a condition for receiving the message by a terminal device is set. The message delivering device comprises a deciding means adapted to decide whether the message is to be received by the terminal device on the basis of the condition, and a transmitting means adapted to transmit the message to the terminal device on the basis of the deciding result of the deciding means.

Furthermore, the invention proposes a terminal device for receiving a message for which a condition for receiving the message is set for use in network according to claim 19. The terminal device comprises a receiving means for receiving the message, a judging means for judging whether a delivery report is to be transmitted or not in response to receiving the message, and a transmitting means for transmitting the delivery report in case the judging means judges that the delivery report is to be transmitted.

In particular, the condition which is set for receiving or not receiving a message can be the location of the terminal, for example. That is, delivering of the message can be made dependent on whether the terminal, i.e., the user, is in a particular area. This is useful for transmitting advertisements, tourist information regarding a specific area or the like.

The location can be detected, for example, by accessing a Mobile Location Centre (MLC) for obtaining the latest position of the terminal. The location could also be available, for example at the home location register (HLR) or visitor location register (VLR). By this measure, the latest position can easily be obtained by referring to network elements already implemented in the network.

Also other conditions for receiving the message are possible. For example, an originator of the messages can be listed in a database of the terminal device, i.e., the mobile station. Hence, if a user of a terminal device is always interested to receive messages from a particular originator, this originator can be included in such a database. Then, receiving of the message can easily be permitted.

Moreover, the originator can belong to a group which is defined on the network side. Thus, if the user of the terminal device is always interested to receive messages from this originator group, this group can be listed in the database.

Furthermore, the recipient of the messages can be in a specific state with respect to willingness to receive messages in general or messages of given type or category. The state of the recipient may be enquired by the deciding means. The category condition of the message may have been set at the originator side automatically by the network, e.g., in order to prevent advertisement type of messaging without permission.

The information regarding the condition for receiving a message can be included in an optional field of the message. Hence, the information necessary to judge whether the deciding step is required can easily be detected within the message.

Furthermore, the terminal device can be determined as being inactive or busy in case it is decided that the condition is not met. By this measure, such a terminal device can be handled in the same way as if the terminal is not available in the moment. That is, no special procedure for handling messages which do not meet the condition is required. Furthermore, it can be decided whether delivering of the message should be tried later again or whether the message should not be delivered at all, as it is possible for a normal communication (e.g., phone call or fax transmission).

A delivery report can be sent to the originator of the message, i.e., the user of the multimedia message generator 1. However, it can be arranged that the delivery report can only be sent if the originator of the message is permitted to receive the delivery report. By this measure, it is taken care of the privacy of a user.

That is, by this measure the user can avoid that someone is able to track his location without his consent.

The originators which are permitted to receive delivery reports from the particular terminal can be stored in a list in a database. Thus, the user does not have to decide for each reception of a message whether a delivery report should be transmitted or not.

Alternatively, a group of users can be defined which may receive delivery reports. That is, if the decision as to whether an originator is permitted to receive delivery reports, a detection whether the originator is a member of the group is sufficient. This measure simplifies the decision.

Furthermore, in order to identify an originator as a member of such a group of users, a group identifier can be added or attached to the message. Hence, an easy detection is possible.

The message can be a multimedia message. In this case, the above advantages are considerably important since multimedia messages are usually large. Therefore, the load on the network due to messages not required can be reduced considerably.

Furthermore, the network can be a mobile network and the terminal device can be a mobile station. Especially in case of a mobile network, the invention is advantageously since a mobile network usually has only limited capacities for transmitting large messages.

Other objects and features of the present invention will become apparent from the following detailed description considered in conjunction with the accompanying drawings.

It is to be understood, however, that the drawings are intended solely for purposes of illustration and not as a definition of the limits of the invention, for which reference should be made to the appended claims.

BRIEF DESCRIPTION OF THE DRAWINGS

The present invention will be more readily understood with reference to the accompanying drawings in which.

DETAILED DESCRIPTION OF PREFERRED EMBODIMENTS

In the following, a preferred embodiment of the invention is described in more detail with reference to the accompanying drawings.

Figure 1:
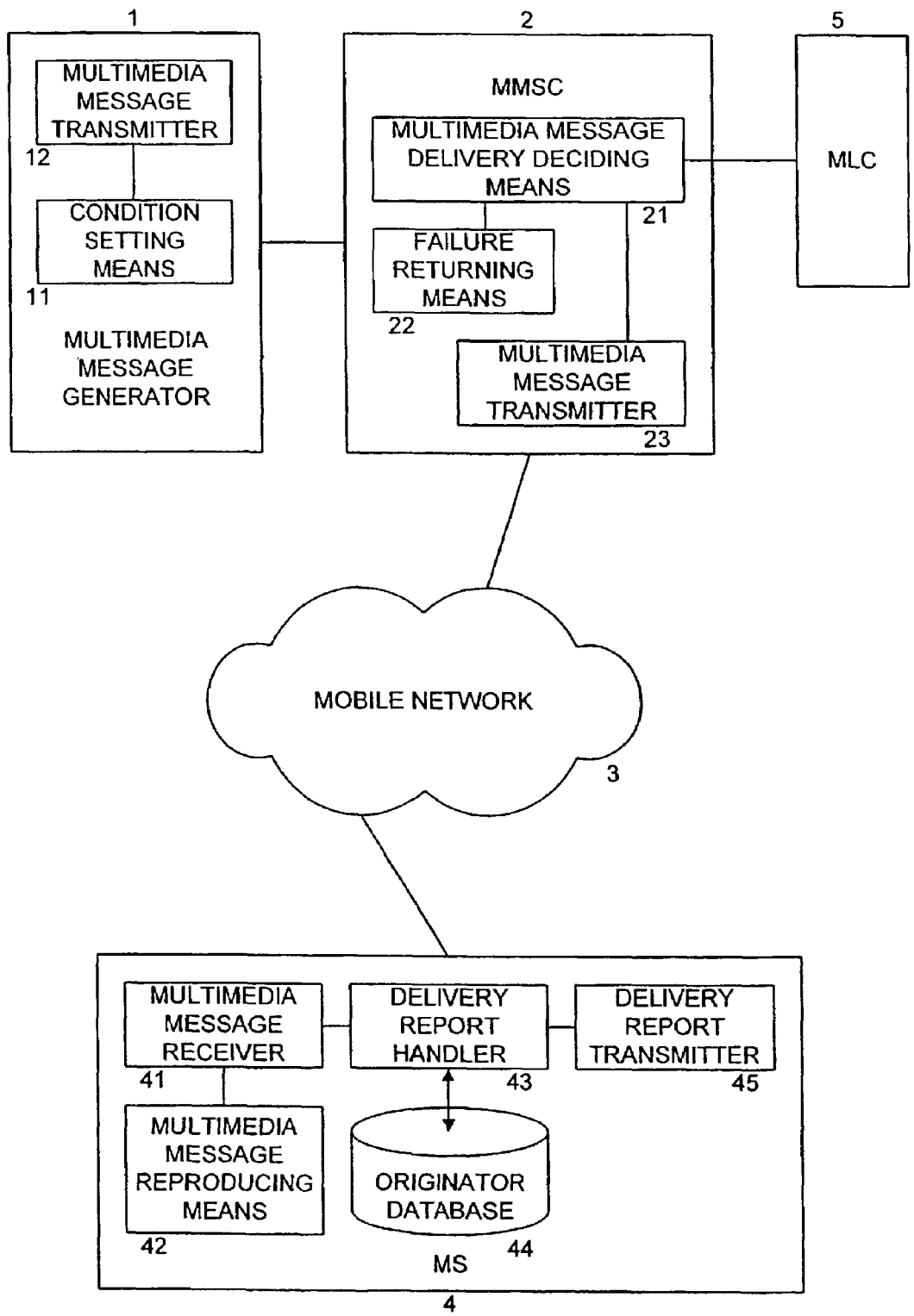
FIG. 1 shows a structure of a network system according to an embodiment.

FIG. 1 shows a general structure of a network system according to the embodiment. According to this embodiment, multimedia messages are delivered via a mobile network. The network system comprises a multimedia message generator 1, a Multimedia Messaging Services Centre MMSC 2 as an example for a message delivering device, a mobile network 3 and a mobile station MS 4 as an example for a terminal device, which is adapted to receive and reproduce multimedia messages.

It is to be noted that for simplifying the description and the drawings only the network elements are shown which are important for the invention. Thus, network elements like base stations BS, base station controllers BSC, Mobile Services Switching Centres MSC and the like are omitted.

In the following, the individual network elements mentioned above and their functions are described in more detail with reference to FIG. 1.

The multimedia message generator 1 is a device by which a multimedia message is generated and transmitted to the mobile network. By this network element, a user can generate a multimedia message. The multimedia message generator 1 can be a mobile station which is adapted to generate such multimedia messages, for example. According to this embodiment, however, it is assumed that the multimedia message generator 1 is fixed and connected to the MMSC 2 via a fixed network.

The multimedia message generator 1 can be realised by a computer including a modem (wherein the multimedia messages are sent to the MMSC via the Internet or Intranet), or by a specially designed terminal or the like.

The specific feature of the multimedia message generator 1 according to the present invention is that the user can set a condition for receiving the multimedia message by the MS 4. According to this embodiment, the condition is the location of the MS 4. That is, the message should only transmitted to the MS 4 in case the MS 4 is located in a certain area. For example, the location condition can be that the MS 4 is located in a particular town or is located in its Home Public Land Mobile Network (HPLMN), home country, in Europe or the like. The multimedia message generator 1 comprises a condition setting means 11 by which a condition regarding the message can be set. According to this embodiment, the condition setting means 11 sets the information regarding the location condition in an optional field of the multimedia message. The multimedia message containing the information regarding the location is transmitted by a message transmitter 12 to the MMSC 2.

The MMSC 2 is a network element necessary for delivering of multimedia messages, as already described in the introductory part. According to this embodiment, the MMSC is expanded by functions for delivering the messages in which a condition for receiving can be set. For simplifying the description, only these additional means are described and shown in FIG. 1.

The MMSC 2 comprises a multimedia message delivery deciding means 21 which investigates the multimedia message received from the multimedia message generator 1. This is effected by checking the optional field of the multimedia message. That is, the multimedia message delivery deciding means 21 extracts the location condition information. The multimedia message delivery deciding means 21 knows from the normal address block of the multimedia message to which mobile station the multimedia message is to be transmitted.

Thus, the current location of the mobile station MS 4 has to be detected. According to this embodiment, the deciding means 21, i.e., the MMSC, accesses a Mobile Location Centre MLC 5 which provides the required location information regarding the MS 4. It is to be noted that this network element or a similar element is usually provided in all mobile networks.

Thus, the multimedia message delivery deciding means 21 decides based on the location condition for the message and the location information received from the MLC 5 whether the condition is fulfilled, i.e., whether the MS 4 is located in the requested area or not.

In case the condition is not met, a failure returning means 22 of the MMSC 2 sends a message back to the multimedia generator 1. In particular, this message is the same message as if the MS 4 would be not available. Hence, for the message generator 1, the MS 4 is considered as not being reachable.

In case the condition is met, the multimedia message is transmitted to the MS 4 via the mobile network 3 by a message transmitter 23.

The multimedia message is received by a multimedia message receiver 41 of the MS 4. The multimedia message is then reproduced by using a message reproducing means 42 which can be a combination of a display and a loudspeaker, for example.

Furthermore, the MS 4 comprises a delivery report handler 43. This handler 43 serves to judge whether a delivery report should be transmitted or not. Namely, the user of the generator 1 can select that a delivery report should be transmitted back to him in response to reception of the multimedia message by the MS 4. However, by this measure the location of a user of the MS 4 could be traced. The user might not wish that the message originator can get aware of his location, and by providing the handler 43 sending of undesired delivery reports can be avoided.

According to this embodiment, the delivery report handler 43 accesses an originator database 44 in which the user of the MS 4 has stored a list of originators which may receive delivery reports. As an alternative, such a list of originators can also be stored on the network, i.e., in a suitable network element, e.g., the MMSC. Furthermore, a group of users which are permitted to receive delivery reports can be defined. In this case, a group identifier can be added or attached to the message such that the delivery report handler 43 has only to check whether a group identifier is present in the message (e.g., in a corresponding optional field) and whether members of this group are permitted to receive delivery reports. Group identifiers can also be stored in the database 44.

In case the originator of the current multimedia message is permitted to receive delivery reports, the delivery report is transmitted by a delivery report transmitter 45 via the mobile network 3 to the message generator 1.

Figure 2:
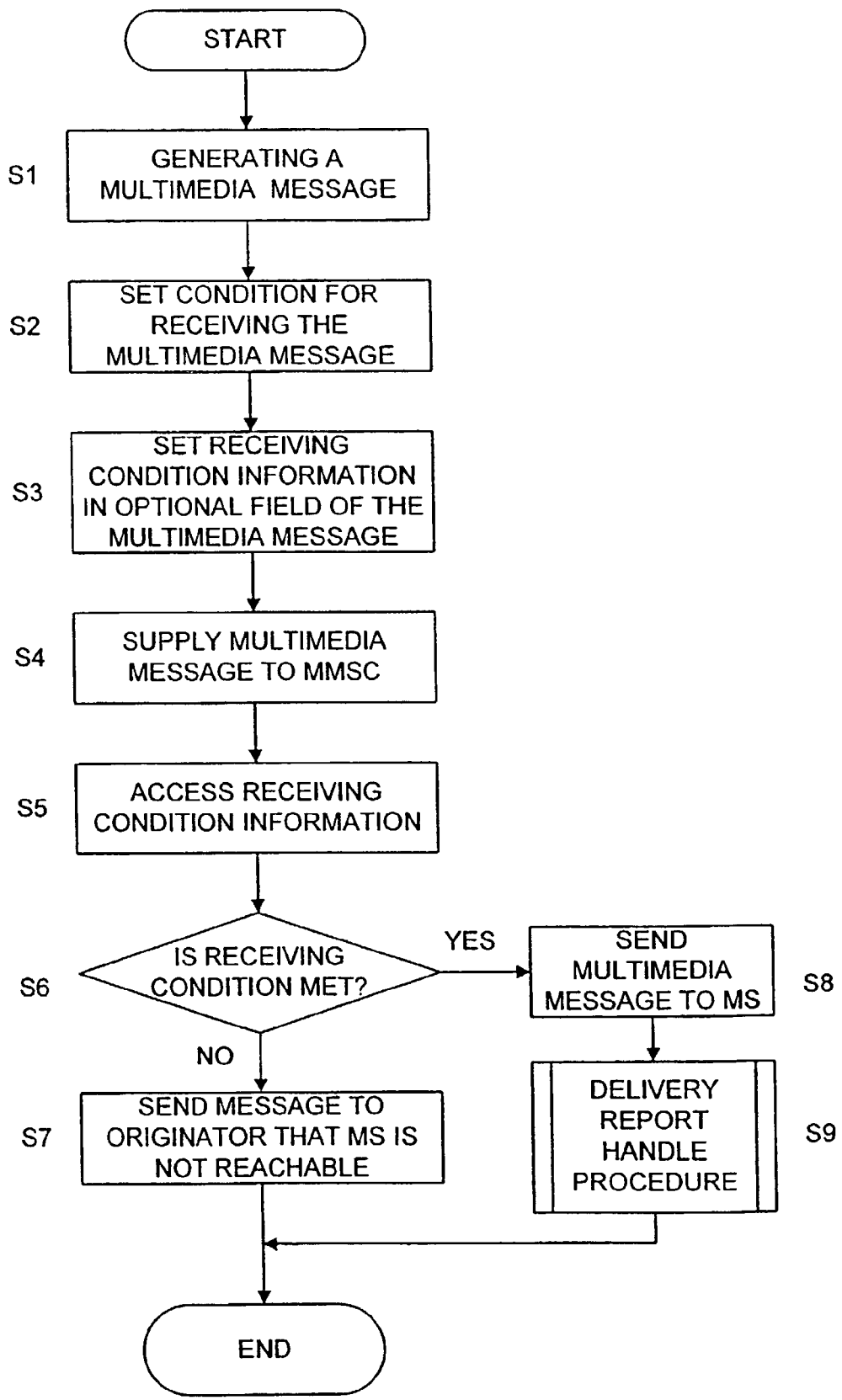
FIG. 2 shows a flow chart of a procedure for delivering multimedia messages according to the embodiment of the invention.
Figure 3:
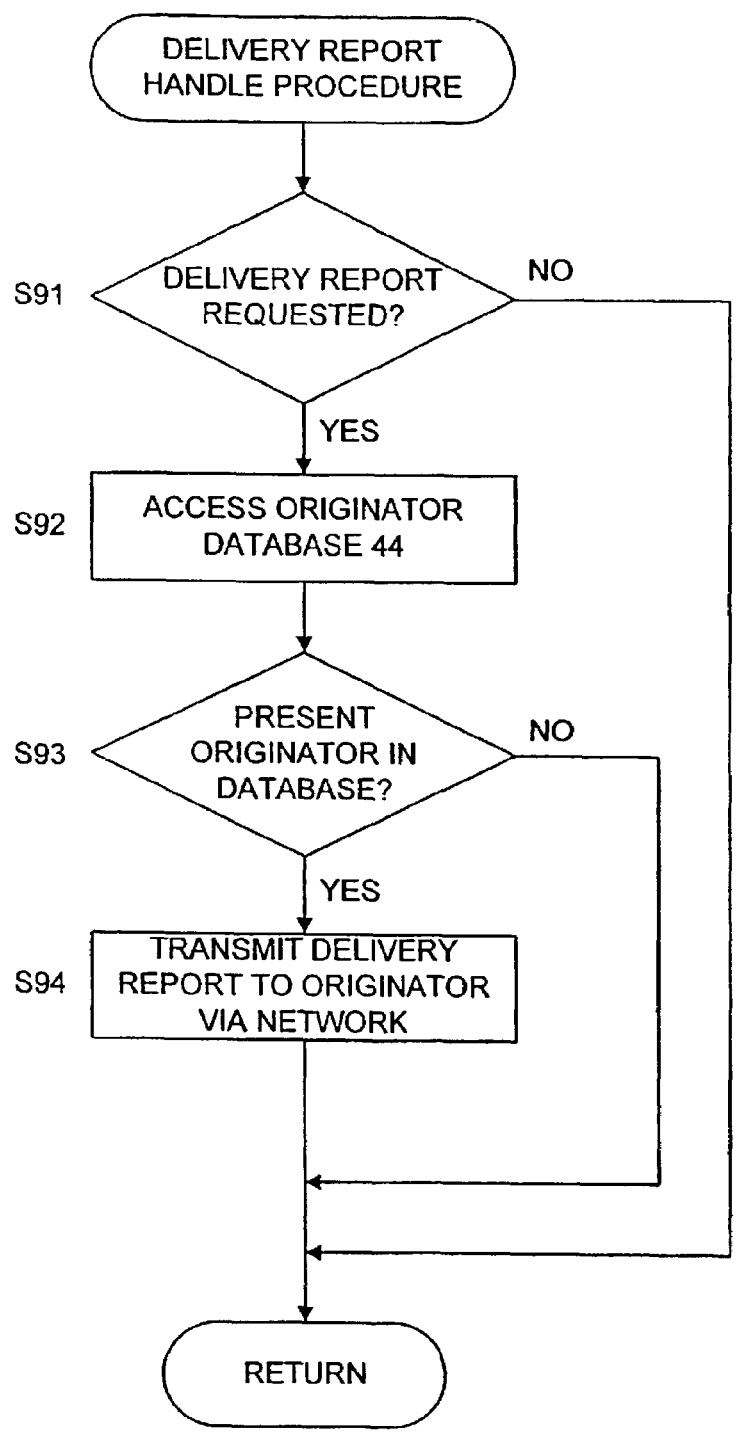
FIG. 3 shows a flow chart of a procedure for handling a delivery report according to the embodiment.

The method according to this embodiment is summarised by referring to the flow charts shown in FIGS. 2 and 3.

Steps S1 and S4 are carried out by the message generator. That is, a message is generated (step S1). Then, the condition for receiving the multimedia message is set (step S2). In the present embodiment, the condition is a location condition. The receiving condition information is set in an optional field of the multimedia message (step S3) and the multimedia message is supplied to the MMSC 2 (step S4).

The MMSC 2 accesses the receiving condition information of the multimedia message (step S5) and decides whether the receiving condition is met or not (step S6). In case the receiving condition is not met (NO in step S6), a message that the MS 4 is inactive or busy is sent to the multimedia message generator 1. In case the receiving condition is met (YES in step S8), the multimedia message actually transmitted via the mobile network 3 to the MS 4.

In the MS 4, the multimedia message is reproduced. In response to receiving the multimedia message, a delivery report handle procedure is carried out (step S9) which is described with reference to the flowchart shown in FIG. 3. This procedure is carried out by the delivery report handler 43.

First, in step S91 it is determined whether a delivery report is requested for the current multimedia message. In case no delivery report is requested (NO in step S91), the procedure is immediately ended. In case a delivery report is requested (YES in step S91), the originator database 44 is accessed (step S92). Then, it is determined whether the originator of the current multimedia message is permitted to receive delivery reports in step S93. That is, if the originator of the present multimedia message could not be found in the database 44, it is determined that the present originator is not allowed to receive delivery reports (NO in step S93), and the procedure is ended without transmitting a delivery report.

On the other hand, if the present originator could be found in the database 44, it is determined that the present originator may receive delivery reports (YES in step S93), and a delivery report is transmitted to the originator (step S94).

According to a modification of the embodiment, the MS 4 does not comprise an originator database 44. Instead, the delivery report handler 43 comprises an operation panel (not shown) by which the user of the MS 4 can input whether he wishes transmitting of the delivery report of the current multimedia message or not. By this measure, the user has to decide regarding the delivery report for every multimedia message. However, this measure has the advantage that the structure of the MS 4 can be simplified and its costs can be reduced since no database is required.

The above description and accompanying drawings only illustrate the present invention by way of example. Thus, the embodiment of the invention and the modification thereof may vary within the scope of the attached claims. For example, the embodiment and the modification thereof can be combined. That is, in case the originator of the current multimedia message could not be found in the database 44, the MS 4 can be arranged such that the user has to input whether he wishes to transmit the delivery report nevertheless. Furthermore, the user can be asked whether he wishes to store such a new originator in the database 44.

As a further alternative, a default value can be provided in the MS. Such a default value is used for delivery report sending and can indicate, always send/always confirm/never send for example. Thus, the user of the MS has a further possibility to control sending of the delivery report in an easy manner.

Moreover, according to the above described embodiment, the message delivering device is included in the MMSC which is a general control element for MMS (Multimedia Messaging Services). However, this device can also be a separate network element or can be included in other network elements, when appropriate.

In addition, the multimedia message generator can also be a part of a mobile station and the connection between the message generator and the MMSC (multimedia message delivering device) can be provided by the mobile network. Also, the terminal device 4 is not limited to a mobile station, this could be also a fixed station.

Moreover, according to the above described embodiment, the condition setting means 11 has been described as a part of the multimedia message generator 1. However, the condition setting means can also be an independent network element. For example, the messages can be generated in a another network under a different administration, whereas the condition is set in the present network, for example in a proxy server or the like.

Finally, the condition described above is not limited to the location condition. For example, also certain information regarding the user of the addressed terminal can be used to set conditions. In this case, the multimedia message delivery deciding means 21 has to be correspondingly modified such that it can access to corresponding databases, for example to the HLR or VLR or more sophisticated databases.

Alternatively, it can be arranged that a user can decide whether he desires to receive a message or not in advance. For example, an originator of the messages can be listed in a database of the terminal device, i.e., the mobile station. Hence, if a user of a terminal device is always interested to receive messages from a particular originator, this originator can be included in such a database. Then, receiving of the message can easily be permitted. Such originators can also be included in a group of originators. Thus, this group can be included in the database.

Furthermore, the recipient of the messages can be in a specific state with respect to willingness to receive messages in general or messages of given type or category. The state of the recipient may be enquired by the deciding means. The category condition of the message may have been set at the originator side automatically by the network, e.g., in order to prevent advertisement type of messaging without permission.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method, comprising:
   delivering messages in a network comprising at least one terminal device, wherein said method comprises:
   generating a message,
   setting a condition for receiving said message,
   deciding whether said message is to be received by said terminal device on the basis of said condition,
   transmitting said message to said terminal device on the basis of a result of the deciding whether said message is to be received,
   deciding, by said device, whether an originator of said message is allowed to receive a delivery report by referring to a list of originators of messages which are allowed to receive delivery reports, and
   transmitting said delivery report to the originator of said message only in case said originator of said message is on said list of originators.

2. The method according to claim 1, wherein the condition is set by a terminal device.

3. The method according to claim 1, wherein said condition is a location of said terminal device.

4. The method according to claim 1, further comprising including information regarding said condition in an optional field of said message.

5. The method according to claim 1, further comprising determining said terminal device as being inactive or busy in case it is decided that said condition is not met.

6. The method according to claim 1, further comprising defining a group of users which are allowed to receive delivery reports, wherein
   in said deciding whether said message is to be received it is detected whether the originator of said received message is a member of said group of users.

7. The method according to claim 6, further comprising adding a group identifier identifying said group of users to said message.

8. The method according to claim 1, wherein said message is a multimedia message.

9. The method according to claim 1, wherein said network is a mobile network and said terminal device is a mobile terminal device.

10. A network system configured to deliver messages in a network, comprising
    a message delivering device; and
    a terminal device; wherein
    said message delivering device comprises a deciding unit configured to decide whether a message is to be received by said terminal device on the basis of a condition for receiving said message, and a transmitting unit configured to transmit said message on the basis of a deciding result of said deciding unit to said terminal device,
    wherein said terminal device further comprises
    a judging unit configured to judge whether a delivery report is to be transmitted or not in response to receiving said message by referring to a database in which a list of originators of messages is stored which are allowed to receive delivery reports; and
    a transmitting unit configured to transmit said delivery report in case said judging unit judges that the originator of said message is on said list of originators.

11. The system according to claim 10, further comprising a setting unit configured to set a condition for receiving a message by said terminal device.

12. The system according to claim 10, wherein said condition is the location of said terminal device.

13. The system according to claim 10, wherein said message comprises an optional field in which information regarding said condition is included.

14. The system according to claim 10, wherein said message delivering device further comprises a determining unit configured to determine said terminal device as not being reachable in case said deciding means decides that said condition is not met.

15. The system according to claim 10, wherein a group of users are defined which are allowed to receive delivery reports, and
    said judging unit is configured to detect whether the originator of said received message is a member of said group of users.

16. The system according to claim 15, wherein said group identifier identifying said group of users is added to said message.

17. The system according to claim 10, wherein said message is a multimedia message.

18. The system according to claim 10, wherein said network is a mobile network and said terminal device is a mobile terminal device.

19. A terminal device configured to receive a message for which a condition for receiving said message is set for use in network, comprising
    a receiving unit configured to receive said message;
    a judging unit configured to judge whether a delivery report is to be transmitted or not in response to receiving said message by referring to a database in which a list of originators of messages is stored which are allowed to receive delivery reports; and
    a transmitting unit configured to transmit said delivery report in case said judging unit judges that the originator of said message is on said list of originators.

20. The terminal device according to claim 10, wherein said condition is the location of said terminal device.

21. The terminal device according to claim 19, wherein said message is a multimedia message.

22. The terminal device according to claim 19, wherein said network is a mobile network and said terminal device is a mobile terminal device.

23. A network system for delivering messages in a network, comprising
    a message delivering device; and
    a terminal device; wherein
    said message delivering device comprises means for deciding whether a message is to be received by said terminal device on the basis of a condition for receiving said message, and means for transmitting said message on the basis of a deciding result of said means for deciding to said terminal device,
    wherein said terminal device further comprises
    means for judging whether a delivery report is to be transmitted or not in response to receiving said message;
    means for storing a list of originators of messages which are allowed to receive delivery reports and which is accessed by said means for judging; and
    means for transmitting said delivery report in case said means for judging judges that said delivery report is to be transmitted.

24. A terminal device for receiving a message for which a condition for receiving said message is set for use in network, comprising
    means for receiving said message;
    means for judging whether a delivery report is to be transmitted or not in response to receiving said message;
    means for storing a list of originators of messages which are allowed to receive delivery reports and which is accessed by said means for judging; and
    means for transmitting said delivery report in case said judging means judges that said delivery report is to be transmitted.

* * * * *